Aug. 10, 1965       B. A. FIERSTINE       3,199,902
BALL JOINT UNIT WITH COMBINATION THREAD
PROTECTOR AND SEAL RETAINER
Filed Nov. 8, 1962

INVENTOR.
Burton A. Fierstine
BY
ATTORNEY

United States Patent Office
3,199,902
Patented Aug. 10, 1965

3,199,902
BALL JOINT UNIT WITH COMBINATION THREAD PROTECTOR AND SEAL RETAINER
Burton A. Fierstine, Saginaw, Mich., assignor to General Motors Corporation, Detroit, Mich., a corporation of Delaware
Filed Nov. 8, 1962, Ser. No. 236,195
5 Claims. (Cl. 287—87)

This invention relates to ball joint units and more particularly to a ball joint unit including one-piece disposable means for simultaneously protecting the thread end of the stud portion thereof and retaining the seal element in installed position prior to final installation.

An object of the invention is to provide an improved ball joint unit.

Another object is to provide a ball joint unit including a disposable protective element for the threaded stud portion thereof.

A further object is to provide a unit of the type described wherein the protective element is formed in relation to the complete assembly in such a way that it may be installed on the threaded stud portion immediately after formation of the threads and remain thereon continuously during all subsequent assembly operations as well as during storage and shipment.

A still further object is to provide a ball joint unit of the type described wherein the protective element includes resiliently collapsible means enabling sliding installation of a seal element thereover, the collapsible means thereafter returning to normal position and functioning to prevent accidental disassembly of the seal.

These and other objects, advantages and features of the invention will become more fully apparent as reference is had to the accompanying specification and drawing wherein.

Figure 1:
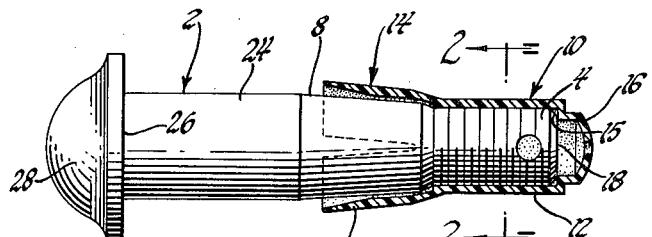
FIGURE 1 is a side elevational view, partly in section, of a ball stud element having a threaded end over which is disposed a combination thread protector and seal retainer fashioned in accordance with the invention.
Figure 2:
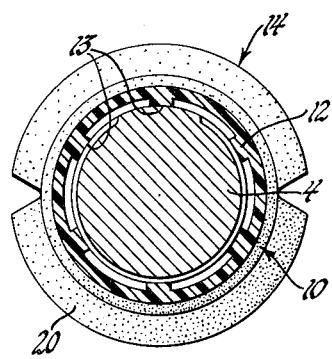
FIGURE 2 is a greatly enlarged cross-sectional view looking in the direction of arrows 2—2 of FIGURE 1.

In common with a large number of vehicle components, suspension ball joint units are comprised of a number of individual parts which are fabricated separately and subsequently pass through a series of assembly operations, certain if not all of which involve mechanical handling in which risk of damage exists. In the case of ball joint units, the ball stud element 2 is formed with a threaded lower end portion 4 which is susceptible to damage by burring, denting, etc., during the various assembly operations subsequent to thread forming, as well as during the storage and handling preceding final installation of a vehicle. Since the ball stud of a lower suspension ball joint assembly of the type illustrated does not significantly resist rotation within the ball joint casing 6, installation of a nut, not shown, on the threaded portion depends solely on the antirotation resistance established by frictional engagement between the tapered portion 8 of the ball stud and a corresponding tapered opening formed in a portion of the vehicle suspension, not shown. Obviously, even slight burring of the threads 4 at any stage of manufacture subsequent to thread formation will impair the normal rate of final assembly, or even require scrapping of the unit.

Figure 3:
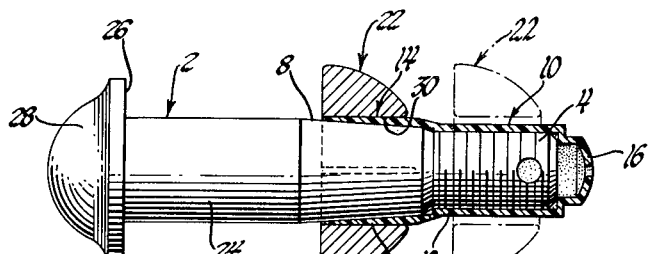
FIGURE 3 is a view similar to FIGURE 1 illustrating progressive installation of the ring bearing portion of the ball stud.
Figure 4:
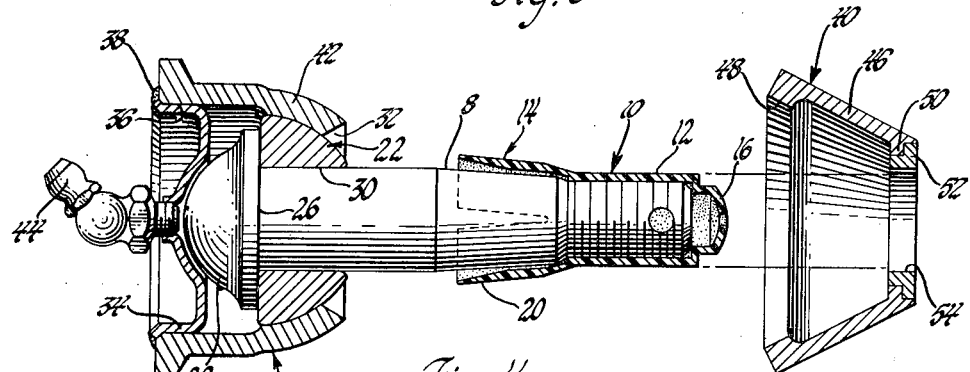
FIGURE 4 is a plan view, partly in section, illustrating the ball joint unit in the semi-final phase of assembly prior to installation of the bearing seal.
Figure 5:
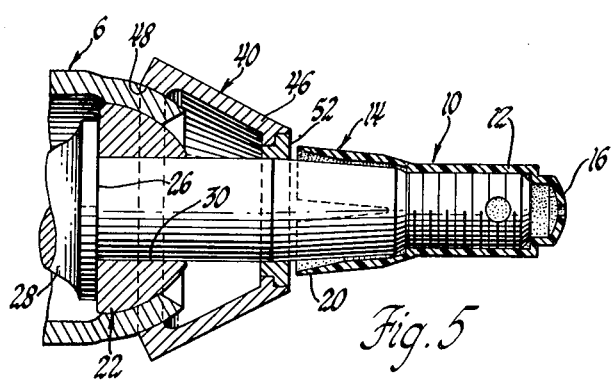
FIGURE 5 is a fragmentary view similar to FIGURE 4 showing the bearing seal in installed position.
Figure 6:
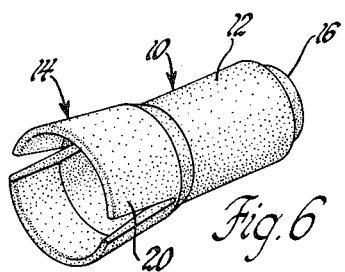
FIGURE 6 is a perspective view of the thread protector and seal retainer.

In accordance with the present invention, the threaded portion 4 of the ball stud 2 is protected against burring or other impact damage immediately following the thread forming operation by the installation of a push-on type elastic socket 10 having a cylindrical end portion 12 formed with inwardly directed circumferentially spaced axial ribs 13 which grippingly engage the threaded portion 4. Merging with cylindrical portion 12 is a split flared mouth portion 14 which collapsibly surrounds the tapered portion 8. Socket 10 includes an integral end cap 16 having a bottoming flange 15 which engages the end face 18 of end portion 4 to establish the push-on position of the socket. As seen in FIGURE 3, the wall 20 of mouth portion 14 is tapered in longitudinal section so as to enable endwise sliding disposition of a bearing ring element 22 thereover onto the cylindrical portion 24 of ball stud 2 into abutting engagement with the face 26 of semi-spherical ball portion 28 formed integrally on stud 2. Specifically wall 20 is tapered in cross section so that when collapsed radially inwardly into engagement with intermediate tapered portion 8 between cylindrical portion 24 and threaded portion 4, the outside diameter of mouth 14 corresponds to the inside diameter of bore 30 in bearing ring 22. Naturally, as soon as bearing ring 22 has moved axially beyond mouth portion 14, the latter returns to the normal flared configuration as a result of a plastic memory. Thereafter, the bearing ring is prevented from accidental removal during subsequent handling prior to the endwise insertion of the stud and thread protector into the interior of casing 6 and through the opening 32 therein. After the indicated insertion, a casing plug 34 is installed over the opposite open end 36 and secured therein as by welding 38 to maintain the ball joint unit in assembled relation. During this procedure, the plastic socket 10 remains in the initially installed position over threaded end 4.

Because the juncture of bearing ring 22 and opening 32 affords limited access to the interior of casing 6, an elastomeric seal element 40 is disposed over the cylindrical portion 24 of stud 2 in surrounding relation with the lower outer wall portion 42 of casing 6 to prevent entrance of foreign matter and/or loss of lubricant introduced through grease fitting 44. In accordance with the invention, seal 40 comprises a generally frusto-conical body portion 46 having a radially inturned lip portion 48 adapted for wiping engagement with wall 42 and a base portion 50 including an imbedded ring 52 adapted for precision sliding engagement with stud cylindrical portion 16. Inasmuch as the inside diameter 54 of ring 52 corresponds to the outside diameter of stud cylindrical portion 24, it will be seen that split mouth 14 of socket 10 also functions to prevent retraction or accidental loss of the grease seal during subsequent storage and handling of the ball joint unit prior to final installation in a vehicle suspension.

From the foregoing it will be seen that a novel and improved ball joint unit has been provided. The invention not only affords complete protection for the critical thread portion at all times subsequent to initial formation thereof, but in addition substantially aids in the normal assembly processes involved in manufacturing the complete unit. In addition, the multiple function of the protective socket is accomplished without compromising conventional structural configuration of the components which form the ultimate operating elements of the ball joint.

While but one embodiment of the invention has been shown and described, it will be apparent that other changes

I claim:

1. In a ball joint unit, a ball stud having a semi-spherical head formed at one end thereof and a threaded portion formed at the other end thereof, a cylindrical portion adjacent said head, a tapered intermediate portion connecting said cylindrical portion and said threaded portion, a bearing ring rotatably engaging said cylindrical portion and abutting said head, and a push-on sleeve-like plastic protective element surrounding said threaded portion, said element including a normally flared split end portion forming an annular wall of tapered longitudinal section overlying said tapered portion, said annular wall being dimensioned so that when collapsed against said tapered portion the outer periphery thereof forms an outside diameter no greater than the outside diameter of said cylindrical portion, whereby said bearing ring may be assembled on said cylindrical portion after installation of said protective element.

2. In combination with a ball joint unit of the type including a ball stud having an integral semi-spherical head portion and an adjacent cylindrical portion rotatably supporting an endwise movable semi-spherical bearing ring, said stud portion including a tapered intermediate portion and a threaded end portion, a plastic protective element having a cylindrical portion surrounding and grippingly engaging said threaded end portion, said element including a normally flared split end portion enveloping said tapered portion, said end portion forming an annular wall tapered in longitudinal section and dimensioned peripherally so that when urged into clasping engagement with said tapered portion the outside diameter of said end portion is less than the inside diameter of said bearing ring.

3. The structure set forth in claim 2 wherein the inside of the cylindrical portion of said plastic element is formed with a plurality of circumferentially spaced radially inwardly projecting axial ribs.

4. The structure set forth in claim 2 wherein said plastic element includes means adjacent one end for limiting axial movement thereof in the direction of said semi-spherical head.

5. In a ball joint unit, a ball stud having an enlarged semi-spherical head formed at one end thereof and a threaded portion formed at the other end, a cylindrical portion adjacent said head, a tapered intermediate portion extending between said cylindrical portion and said threaded portion, a semi-spherical bearing ring rotatably engaging said cylindrical portion and abutting said head, a casing enveloping said head and bearing ring, said casing having an opening therein through which a part of said cylindrical portion projects, a flexible annular seal extending between said casing and the part of said cylindrical portion projecting beyond said casing, said seal including a semi-rigid bearing element slidably embracing said cylindrical portion, and a push-on plastic protective element having a cylindrical portion grippingly engaging and surrounding said threaded portion, said element including a normally flared split end portion forming an annular wall of tapered longitudinal section overlying said tapered portion which is radially inwardly yieldable into collapsed engagement therewith, said annular wall having a collapsed outside diameter no greater than the inside diameter of either said bearing ring or said semi-rigid bearing element, whereby both of the latter may be assembled on said cylindrical portion subsequent to installation of said protective element.

References Cited by the Examiner

UNITED STATES PATENTS

| | | |
|---|---|---|
| 1,728,769 | 9/29 | Pasman. |
| 2,195,530 | 4/40 | Curtis. |
| 2,551,834 | 5/51 | Ferguson. |
| 2,797,930 | 7/57 | Booth. |
| 2,849,895 | 9/58 | Hawkins. |
| 2,873,765 | 2/59 | Gregory _____ 138—96 |
| 2,899,483 | 8/59 | Robertson et al. |

FOREIGN PATENTS 905,085  2/54  Germany.

CARL W. TOMLIN, *Primary Examiner.*